(12) United States Patent
Saiki et al.

(10) Patent No.: US 7,355,663 B2
(45) Date of Patent: Apr. 8, 2008

(54) POLARIZING PLATE AND LIQUID CRYSTAL DISPLAY USING THE SAME

(75) Inventors: Yuji Saiki, Ibaraki (JP); Senri Kondou, Ibaraki (JP); Youichirou Sugino, Ibaraki (JP); Seiichi Kusumoto, Ibaraki (JP); Eiji Hamamoto, Ibaraki (JP); Takashi Shouda, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 78 days.

(21) Appl. No.: 10/001,709

(22) Filed: Oct. 23, 2001

(65) Prior Publication Data

US 2002/0075428 A1 Jun. 20, 2002

(30) Foreign Application Priority Data

Oct. 26, 2000 (JP) ............................. 2000-327247
Aug. 2, 2001 (JP) ............................. 2001-235259

(51) Int. Cl.
*G02F 1/1335* (2006.01)

(52) U.S. Cl. .................. 349/96; 349/114; 349/117; 348/E5.143; 348/E9.027

(58) Field of Classification Search .................. 349/96, 349/117, 118, 113, 114, 119, 179, 180, 181; 359/485, 499–500
See application file for complete search history.

(56) References Cited

U.S. PATENT DOCUMENTS

| 4,025,688 A | * | 5/1977 | Nagy et al. .................. 428/350 |
| 6,008,940 A | * | 12/1999 | Michihata et al. ........... 359/483 |
| 6,088,067 A | * | 7/2000 | Willett et al. ..................... 349/5 |
| 6,088,079 A | * | 7/2000 | Kameyama et al. ......... 349/185 |
| 6,094,245 A | * | 7/2000 | Ochi et al. ..................... 349/96 |
| 6,111,697 A | * | 8/2000 | Merrill et al. ............... 359/497 |
| 6,236,439 B1 | * | 5/2001 | Saiki et al. .................. 349/117 |
| 6,268,961 B1 | * | 7/2001 | Nevitt et al. ................ 359/488 |
| 6,297,908 B1 | * | 10/2001 | Suga ............................ 359/599 |
| 6,498,633 B1 | * | 12/2002 | Ozeki et al. ................... 349/96 |
| 6,523,958 B2 | * | 2/2003 | Takezawa et al. ............. 353/20 |
| 6,600,529 B1 | * | 7/2003 | Kusumoto et al. ............ 349/96 |

(Continued)

FOREIGN PATENT DOCUMENTS

EP   1 052 451   * 11/2000

(Continued)

OTHER PUBLICATIONS

Japanese Patent Abstract, Publication No. 11064631 A, Publication Date: Mar. 5, 1999, 1 page.

(Continued)

*Primary Examiner*—A. Sefer
(74) *Attorney, Agent, or Firm*—Westerman, Hattori, Daniels & Adrian, LLP.

(57) ABSTRACT

A polarizing plate excellent in polarization performance in all wavebands from a short wavelength region to a long wavelength region and a liquid crystal display using such a polarizing plate. The polarizing plate including a polarizer has a portion having a polarization degree of 99% or more at each wavelength of light for wavelengths of 420 to 550 nm and a portion having a polarization degree of 99% or more at each wavelength of light for wavelengths of 550 to 700 nm.

34 Claims, 3 Drawing Sheets

U.S. PATENT DOCUMENTS

| | | | |
|---|---|---|---|
| 6,654,085 B1 * | 11/2003 | Koike et al. | 349/112 |
| 6,661,482 B2 * | 12/2003 | Hara | 349/96 |
| 6,683,717 B1 * | 1/2004 | Miyatake et al. | 359/490 |
| 6,706,339 B1 * | 3/2004 | Miyatake et al. | 428/1.31 |
| 2002/0012168 A1 * | 1/2002 | Li | 359/487 |
| 2002/0015807 A1 * | 2/2002 | Sugino et al. | 428/1.31 |
| 2002/0033919 A1 * | 3/2002 | Sanelle et al. | 349/122 |
| 2002/0093284 A1 * | 7/2002 | Adachi et al. | 313/506 |
| 2002/0180678 A1 * | 12/2002 | Taira et al. | 345/88 |
| 2003/0048396 A1 * | 3/2003 | Ishii et al. | 349/96 |
| 2003/0053011 A1 * | 3/2003 | Mori | 349/96 |
| 2003/0086170 A1 * | 5/2003 | Hamamoto et al. | 359/491 |
| 2004/0180149 A1 * | 9/2004 | Shibue et al. | 428/1.1 |
| 2004/0189907 A1 * | 9/2004 | Tominaga et al. | 349/115 |
| 2004/0246581 A1 * | 12/2004 | Miyatake et al. | 359/495 |

FOREIGN PATENT DOCUMENTS

| | | | |
|---|---|---|---|
| JP | 58-60730 | | 4/1983 |
| JP | 59-139021 | | 8/1984 |
| JP | 61-32005 | * | 2/1986 |
| JP | 62-229225 | * | 10/1987 |
| JP | 6-59123 | * | 3/1994 |
| JP | 8-271934 | * | 10/1996 |
| JP | 11-64631 | * | 3/1999 |
| JP | 11-84318 | * | 3/1999 |
| JP | 2000-310774 | * | 11/2000 |
| JP | 2001-330822 | * | 9/2001 |

OTHER PUBLICATIONS

Japanese Patent Abstract, Publication No. 58060730 A, Publication Date: Nov. 4, 1983, 1 page.

Japanese Patent Abstract Publication No. 59139021 A, Publication Date: Aug. 09, 1984, 1 page.

* cited by examiner

POLARIZING PLATE AND LIQUID CRYSTAL DISPLAY USING THE SAME

BACKGROUND OF THE INVENTION

1. Field of the Invention

The present invention relates to a polarizing plate used for a liquid crystal display (LCD) and a liquid crystal display using such a polarizing plate.

2. Description of the Prior Art

Recently, demand for LCDs used for, for example, personal computers has increased sharply. Application for LCDs has also broadened. Recently, such LCDs are used for monitoring as well.

A polarizing plate used for a LCD is manufactured, for example, by a method including steps of dyeing a polyvinyl alcohol (PVA) film with dichroic iodine or a dichroic dyestuff; crosslinking the film with boric acid, borax, or the like; stretching the film uniaxially, followed by drying the film and sticking it to a protective layer such as a triacetylcellulose (TAC) film. The respective steps of dyeing, crosslinking and stretching are not necessarily carried out separately and can be carried out simultaneously. Furthermore, there is no limitation on the order of the steps.

In recent years, as LCDs are used for high performance equipment such as for monitoring, the hue of a polarizing plate has a large effect on the hue of a liquid crystal display.

Generally, if polarization performance in a short wavelength region is enhanced, polarization performance in a long wavelength region lowers. To the contrary, if polarization performance in a long wavelength region is enhanced, polarization performance in a short wavelength region lowers. Accordingly, it has been difficult to achieve excellent polarization performance in all wavebands from a short wavelength region to a long wavelength region. As a result, there arises a problem that the hue of the liquid crystal display becomes bad.

SUMMARY OF THE INVENTION

In one aspect, the present invention relates to a polarizing plate capable of obtaining excellent polarization performance in all wavebands from a short wavelength region to a long wavelength region and a liquid crystal display using such a polarizing plate.

In one aspect of the present invention, a polarizing plate of the present invention includes a polarizer including a first portion having a polarization degree of 99% or more at each wavelength of light for wavelengths of 420 to 550 nm, and a second portion having a polarization degree of 99% or more at each wavelength of light for wavelengths of 550 to 700 nm, wherein the first portion and the second portion are laminated.

Thus, it is possible to obtain a polarizing plate having excellent polarization performance in all wavebands from a short wavelength region to a long wavelength region.

Moreover, in another aspect, a first portion having a polarization degree of 99% or more when the above-mentioned wavelength is at 440 to 520 nm and a second portion having a polarization degree of 99% or more when the above-mentioned wavelength is at 580 to 680 nm can be laminated. More preferably, a first portion having a polarization degree of 99% or more when the above-mentioned wavelength is at 430 to 530 nm and a second portion having a polarization degree of 99% or more when the above-mentioned wavelength is at 570 to 690 nm are laminated. Most preferably, a portion having a polarization degree of 99% or more when the above-mentioned wavelength is 420 to 550 nm and a second portion having a polarization degree of 99% or more when the above-mentioned wavelength is at 550 to 700 nm are laminated. In the most preferable range of wavelengths, the polarization degree is preferably higher, more preferably the polarization degree is 99.3% or more, and further preferably 99.5% or more.

Furthermore, in the most preferable range of wavelengths, a branch wavelength between the short wavelength and the long wavelength is 550 nm. However, the present invention is not limited to this value. The branch wavelength may be, for example, 530 nm, 540 nm, 560 nm and 570 nm.

Furthermore, in another aspect of the present invention, a polarizing plate of the present invention includes a polarizer including a first portion having a polarization degree of 99% or more at each wavelength of light for wavelengths of 420 to 550 nm, and a second portion having a polarization degree of 99% or more at each wavelength of light for wavelengths of 550 to 700 nm, wherein the first portion and the second portion are laminated by an adhesive.

Furthermore, in the polarizing plate of the present invention, a refractive index of the adhesive is preferably in a range of 1.46 to 1.52, and more preferably in a range of 1.47 to 1.51. When the refractive index of the adhesive is in the range of 1.46 to 1.52, in the configuration of polarizer-adhesive-polarizer, surface reflection can be limited.

Furthermore, it is preferable in the polarizing plate of the present invention that the adhesive is a polyvinyl alcohol-based adhesive.

Furthermore, it is preferable in the polarizing plate of the present invention that the adhesive is a urethane-based adhesive.

Furthermore, in another aspect of the present invention, a polarizing plate of the present invention includes a polarizer including: a first portion having a polarization degree of 99% or more at each wavelength of light for wavelengths of 420 to 550 nm, and a second portion having a polarization degree of 99% or more at each wavelength of light for wavelengths of 550 to 700 nm, wherein the first portion and the second portion are laminated by a pressure-sensitive adhesive.

Furthermore, in the polarizing plate of the present invention, a refractive index of the pressure-sensitive adhesive is preferably in a range of 1.46 to 1.52, and more preferably in a range of 1.47 to 1.51. When the refractive index of the pressure-sensitive adhesive is in the range of 1.46 to 1.52, in the configuration of polarizer-pressure-sensitive adhesive-polarizer, surface reflection can be prevented.

Furthermore, in the polarizing plate of the present invention, the first portion having a polarization degree of 99% or more at each wavelength of light for wavelengths of 420 to 550 nm and the second portion having a polarization degree of 99% or more at each wavelength of light for wavelengths of 550 to 700 nm are laminated so that the absorption axes are disposed in parallel to each other.

Furthermore, it is preferable that the polarization plate of the present invention further includes a reflector or a transreflector attached thereto.

Furthermore, it is preferable that the polarization plate of the present invention further includes a retardation plate or a λ plate attached thereto.

Furthermore, it is preferable that the polarization plate of the present invention further includes a viewing angle compensating film attached thereto.

Furthermore, it is preferable that the polarization plate of the present invention further includes a brightness-enhanced film attached thereto.

In another aspect, the present invention relates to a liquid crystal display including a liquid crystal cell and the above mentioned polarizing plate, wherein the polarizing plate is used on at least one side of the crystal cell.

DESCRIPTION OF THE PREFERRED EMBODIMENTS

The present invention provides a polarizing plate having excellent polarization performance in all wavebands from a short wavelength region to a long wavelength region by using a polarizer having a portion with high polarization performance in a short wavelength region and a portion with high polarization performance in a long wavelength region and provides a liquid crystal display using such a polarizing plate.

Figure 3:
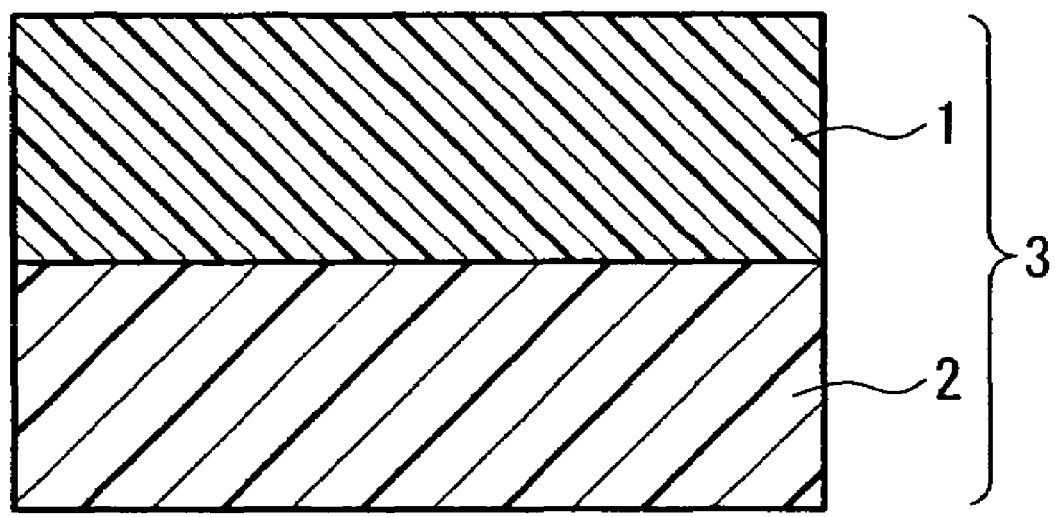
FIG. 3 is a schematic view of a polarizer 3 comprising a first portion 1 and a second portion 2 in accordance with the present invention.
Figure 4:
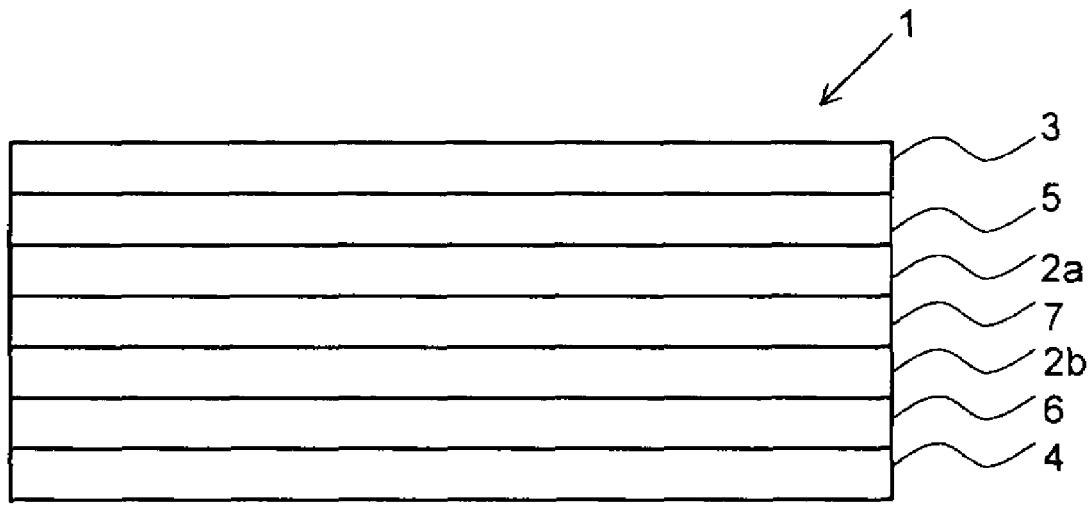
FIG. 4 is a schematic view of another polarizing plate comprising a polarizer having two portions according to the present invention.

In the polarizing plates 1 according to the present invention shown on FIGS. 3-4, the polarizing plate comprises a polarizer 2 having a polarizer portion 2a with high polarization performance in a short wavelength region and a polarizer portion 2b with high polarization performance in a long wavelength region.

In other words, it is confirmed that by using a polarizer in which a portion having a polarization degree of 99% or more at each wavelength of light for wavelengths of 420 to 550 nm and a portion having a polarization degree of 99% or more at each wavelength of light for wavelengths of 550 to 700 nm are laminated, the polarizing plate having excellent polarization performance in all wavebands from a short wavelength region to a long wavelength region can be obtained.

The polarization degree is calculated from the following equation:

$$\text{polarization degree} = \sqrt{\frac{A-B}{A+B}} \times 100$$

wherein A denotes a parallel transmittance (transmittance when the polarizing axes of two polarizing plates are placed in parallel to each other) and B denotes an orthogonal transmittance (transmittance when the polarizing axes of two polarizing plates are placed orthogonal to each other).

In a basic configuration of the polarizing plate used in the present invention, a transparent protective film as a protective layer is adhered to one side or both sides of the polarizer made of a polyvinyl alcohol-based polarizing film containing dichroic substance, and the like, via an appropriate adhesive layer, for example, a layer of adhesive made of, for example, a vinyl alcohol-based polymer.

In the polarizing plate of FIG. 3, transparent protective films 3 and 4 are adhered to the polarizer 2 via adhesive layers 5 and 6.

A polarizer polarizing film) made of an appropriate polyvinyl alcohol polymer film that are known in the art, for example, polyvinyl alcohol film, a partially formalized polyvinyl alcohol film, or the like, is subjected to appropriate treatment such as dyeing with dichroic substances such as iodine and a dichroic dyestuff, stretching, crosslinking into any suitable orders. Any polarizer can be used, as long as it allows linearly polarized light to pass through the film when natural light enters. In particular, a polarizer with an excellent light transmittance and a polarization degree is preferred.

The polarizing plate of the present invention is formed of a polarizer having a structure in which a portion having a polarization degree of 99% or more at each wavelength of light for wavelengths of 420 to 550 nm and a portion having a polarization degree of 99% or more at each wavelength of light for wavelengths of 550 to 700 nm are laminated by an adhesive or a pressure-sensitive adhesive. An adhesive is a large concept in which a pressure-sensitive adhesive is included.

For example, polarizer portions 2a and 2b are laminated directly in the embodiment of Fig. 3 and by adhesive layer 7 in the embodiment of FIG. 4.

As the above-mentioned pressure-sensitive adhesive, it is possible to use an acrylic pressure-sensitive adhesive or a rubber-based pressure-sensitive adhesive having a refractive index ranging from 1.46 to 1.52, or a pressure-sensitive adhesive containing fine particles of zirconia, etc. and the like in the above-mentioned pressure-sensitive adhesive in order to adjust the refractive index.

Furthermore, as the above-mentioned adhesive, it is possible to use a polyvinyl alcohol-based adhesive or a urethane-based adhesive having a refractive index ranging from 1.46 to 1.52. Examples of the polyvinyl alcohol-based adhesive include polyvinyl alcohol, partially saponified polyvinyl acetate, polyvinyl alcohol denatured with a carboxyl group or an acetoacetyl group, formal-treated polyvinyl alcohol, or adhesives prepared by adding a water soluble crosslinking agent such as boric acid, borax, glutaraldehyde, melamine, and nitric acid, in the above-mentioned adhesive, or the like. Examples of the urethane-based adhesive include a reaction adhesive containing polyol and polyisocyanate, solution or emulsion of polyurethane, or the like.

As a material for the protective film forming a transparent protective layer provided on one side or both sides of the polarizer polarizing film), an appropriate transparent film can be used. As the polymer, for example, an acetate-based resin such as triacetylcellulose is generally used. However, the polymer is not necessarily limited thereto.

When some factors such as polarizing property and durability are taken into consideration, preferred transparent protective film is a triacetylcellulose film having a surface saponified with alkali or the like. When transparent protective films are provided on both sides of the polarizing film, one polymer transparent protective film may be used on the front side and another polymer transparent protective film may be used on the backside.

The transparent protective film used for the protective layer may be subject to treatment for providing properties such as hard coating, antireflection, anti-sticking, dispersion, or anti-glaring, as long as the advantages of the present invention are not lost. Hard coating treatment is carried out to prevent scratches on the surfaces of the polarizing plate by, for example, applying a surface of the transparent protective film with a coating film of a hardening resin (e.g., a silicon-based ultraviolet hardening resin) having excellent hardness and smoothness, etc.

Antireflection treatment is carried out to prevent reflection of outdoor daylight on the surface of the polarizing plate by, for example, forming an anti-reflection film in a conventional manner. Furthermore, anti-sticking treatment is carried out to prevent adjacent layers from sticking to each other. Anti-glaring treatment is carried out to prevent visibility of light passing through the polarizing plate from being hindered by outdoor daylight reflected on the surface of the polarizing plate. The anti-glaring treatment can be carried out by providing microscopic asperities on a surface of a transparent protective film in an appropriate manner, for example, by roughening the surface by sand-blasting or embossing, by blending transparent particles, or the like.

An example of the above-mentioned transparent fine particles includes silica, alumina, titania, zirconia, stannic oxide, indium oxide, cadmium oxide, antimony oxide or the like, which have an average particle diameter ranging from 0.5 μm to 20 μm. Inorganic fine particles having electroconductivity may also be used. Alternatively, organic fine particles including, for example, crosslinked or uncrosslinked polymer particles, etc. can be used. The amount of the transparent fine particles ranges generally from 2 parts by weight to 70 parts by weight, and particularly from 5 parts by weight to 50 parts by weight for 100 parts by weight of the transparent resin.

An anti-glare layer including transparent fine particles can be provided as the transparent protective layer or a coating layer applied onto the surface of the transparent protective layer. The anti-glare layer may have a function as a diffusion layer to diffuse light passing through the polarizing plate in order to enlarge viewing angle (this function is referred to as a viewing angle compensating function). The above-mentioned layers such as the antireflection layer, the anti-sticking layer, the diffusion layer, and the anti-glare layer can be provided separately from the transparent protective layer as an optical layer, for example, in sheet form including the above-mentioned layers.

There is no specific limitation on treatment for adhering the polarizer (polarizing film) to the transparent protective film that is a protective layer. Adhesion can be carried out, for example, by using an adhesive such as an adhesive including a vinyl alcohol-based polymer, or an adhesive including at least a water-soluble crosslinking agent of vinyl alcohol-based polymer such as boric acid, borax, glutaraldehyde, melamine and oxalic acid. A layer of such an adhesive can be formed by, for example, applying and drying an aqueous solution. In preparation of the aqueous solution, other additives, a catalyst such as an acid can be blended if necessary.

In a practical use, a polarizer can be used as an optical member that is laminated onto other optical layer. Though there is no specific limitation on the optical layer, one or two or more of appropriate optical layer(s) applicable for formation of a liquid crystal display, etc. can be used. An example of the optical layer includes, for example, a reflector, a transreflector, a retardation plate (such as a λ plate like a half wavelength plate and a quarter wavelength plate), a viewing angle compensating film, a brightness-enhanced film, and the like. A specifically preferable example of the polarizing plate includes a reflective polarizing plate or a semitransparent polarizing plate formed by laminating an additional reflector or a transreflector on the above-mentioned polarizing plate including a polarizer and a protective layer according to the present invention; an elliptical polarizing plate or a circular polarizing plate formed by laminating an additional retardation plate on the above-mentioned polarizing plate including a polarizer and a protective layer; a polarizing plate formed by laminating an additional viewing angle compensating film on the above-mentioned polarizing plate including a polarizer and a protective layer; and a polarizing plate formed by laminating an additional brightness-enhanced film on the above-mentioned polarizing plate including a polarizer and a protective layer.

Figure 5:
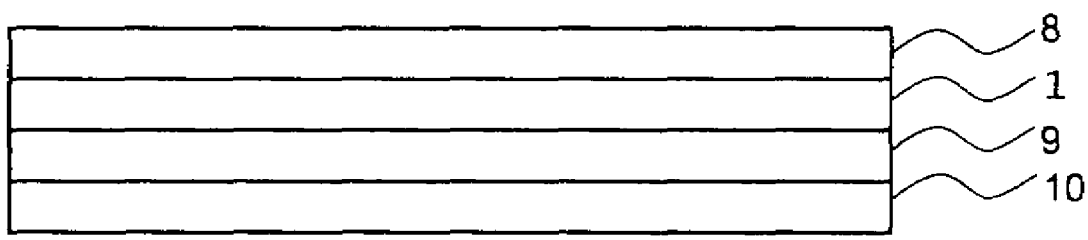
FIG. 5 is a schematic view of a polarizing plate according to the present invention laminated with another optical element.

This is illustrated in FIG. 5, which shows a polarizing plate 1 according to the present invention laminated to another optical layer 8. FIG. 5 also shows an adhesive layer 9 covered by a separator 10.

A reflector is provided on a polarizing plate in order to form a reflective polarizing plate. In general, such a reflective polarizing plate is provided on the backside of a liquid crystal cell in order to make a liquid crystal display, etc. to display by reflecting incident light from a visible side (display side). The reflective polarizing plate has some advantages, for example, light sources such as backlight need not be built in, and thus the liquid crystal display can be thinned further.

The reflective polarizing plate can be formed in an appropriate manner such as attaching a reflecting layer made of, for example, metal on one surface of the polarizing plate via, for example, the above-mentioned transparent protective film as required. As a specific example, a reflecting layer formed by attaching a foil of a reflective metal such as aluminum or a deposition film on one surface of the transparent protective film that has been subjected to matting treatment as required.

An additional example of a reflective polarizing plate includes the above-mentioned transparent protective film having a surface of microscopic asperities due to fine particles contained and a reflecting layer corresponding to the microscopic asperities. The reflecting layer having a surface with microscopic asperities diffuses incident light irregularly, so that directivity and glare can be prevented and irregularity in color tones can be controlled. This transparent protective film can be formed by attaching a metal directly onto a surface of a transparent protective film in any appropriate methods including deposition such as vacuum deposition, and plating such as ion plating and sputtering.

Alternatively, the reflector can be used as, for example, a reflecting sheet formed by providing a reflecting layer onto an appropriate film similar to the transparent protective film, instead of the above-mentioned method of producing a reflector directly on the transparent protective film of the polarizing plate. The reflecting layer of the reflector, which generally is made of metal, is preferably used with its surface covered with a film, a polarizing plate or the like, because the reduction of reflectance due to oxidation can be prevented, the initial reflectance can be maintained for a long time, an additional protective layer need not be formed, or the like.

A semitransparent polarizing plate can be obtained in the same method for forming the reflective polarizing plate except that a semitransparent reflecting layer such as a half mirror, which reflects light and transmits light on the reflecting layer, is used instead of using the reflecting layer. In general, the semitransparent polarizing plate is provided on the backside of a liquid crystal cell. When a liquid crystal display is used in a relatively bright atmosphere, the semitransparent polarizing plate allows an incident light from the visible side (display side) to be reflected to display an image, while in a relatively dark atmosphere, an image is displayed by using a built-in light source such as a backlight in the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

Next, an elliptical polarizing plate or a circular polarizing plate in which a retardation plate is additionally laminated on the above-mentioned polarizing plate including a polarizer and a protective layer will be described.

A retardation plate is used for modifying linearly polarized light to either elliptical polarized light or circular polarized light, modifying elliptical polarized light or circular polarized light to linearly polarized light, or modifying a polarization direction of linearly polarized light. In particular, a retardation plate called a quarter wavelength plate (λ/4 plate) is used for modifying linearly polarized light to circular polarized light, and for modifying circular polarized light to linearly polarized light. A half wavelength plate (λ/2 plate) is generally used for modifying a polarization direction of linearly polarized light.

The elliptical polarizing plate is effective in compensating (preventing) colors (blue or yellow) generated due to birefringence in a liquid crystal layer of a super twist nematic (STN) liquid crystal display so as to provide a black-and-white display free from the above-mentioned colors. Controlling three-dimensional refractive index is further preferred since it can compensate (prevent) colors observed when looking a screen of the liquid crystal display from an oblique direction. A circular polarizing plate is effective, for example, in adjusting color tones of an image of a reflective liquid crystal display that has a color image display, and it also serves to prevent reflection as well.

An example of the retardation plate includes, for example, a birefringent film prepared by stretching an appropriate polymer film, an oriented film of a liquid crystal polymer, and an oriented layer of a liquid crystal polymer that is supported by a film, and the like. Examples of the polymer include, polycarbonate, polyvinyl alcohol, polystyrene, polymethyl methacrylate, polyolefins such as polypropylene, polyalylate, and polyanide. Furthermore, the incline-oriented film is prepared by, for example, bonding a heat shrinkable film to a polymer film and subjecting the polymer film to stretching treatment and/or shrinking treatment under an influence of shrinkage force by heat, or by orienting obliquely a liquid crystal polymer.

Next, a polarizing plate in which a viewing angle compensating film is additionally laminated on the above-mentioned polarizing plate including a polarizer and a protective layer will be described.

The viewing angle compensating film is used for widening a viewing angle so that an image can be seen relatively clearly even when a screen of a liquid crystal display is viewed from a slightly oblique direction.

As the viewing angle compensating film, a triacetylcellulose film etc. coated with a discotic liquid crystal, or a retardation plate are used. While an ordinary retardation plate is a birefringent polymer film that is stretched uniaxially in the face direction, a retardation plate used as the viewing angle compensating film is a two-way stretched film such as a birefringent polymer film stretched biaxially in the face direction, or an incline-oriented polymer film with a controlled refractive index in the thickness direction that is stretched uniaxially in the face direction and stretched also in the thickness direction. The incline-oriented film is prepared by, for example, bonding a heat shrinkable film to a polymer film and subjecting the polymer film to stretching treatment and/or shrinking treatment under an influence of shrinkage force by heat, or by obliquely orienting a liquid crystal polymer. A polymer as a material of the retardation plate is similar to the polymer used for the above-mentioned retardation plate.

A polarizing plate in which a brightness-enhanced film is attached to the above-mentioned polarizing plate including a polarizer and a protective layer is generally arranged on the backside of a liquid crystal cell. When natural light enters by the backlight of the liquid crystal display etc. and reflection from the backside and the like, the brightness-enhanced film reflects linearly polarized light of a predetermined polarizing axis or circularly polarized light in a predetermined direction, while transmitting other light. The polarizing plate in which the brightness-enhanced film is laminated on the above-mentioned polarizing plate including a polarizer and a protective layer allows entrance of light from a light source such as a backlight to obtain transmitted light in a predetermined polarization state, while reflecting light other than light in the predetermined polarization state. Light reflecting by the brightness-enhanced film is reversed through a reflecting layer or the like arranged additionally behind the brightness-enhanced film. The reversed light is allowed to re-enter the brightness-enhanced plate. The re-entering light is transmitted partly or entirely as light in a predetermined polarization state so as to increase the amount of light passing through the brightness-enhanced film and polarized light that is hardly absorbed in the polarizer is supplied so as to increase the amount of light available for the liquid crystal display, etc. Thus, the brightness can be improved. When light enters through a polarizer from the backside of the liquid crystal cell by using a backlight or the like without using any brightness-enhanced films, most of the light having a polarization direction inconsistent with the polarization axis of the polarizer is absorbed in the polarizer but not transmitted by the polarizer. Depending on characteristics of the polarizer, about 50% of light is absorbed in the polarizer, which decreases the quantity of light available in the liquid crystal display or the like and makes the image dark. The brightness-enhanced film repeatedly prevents light having a polarization direction to be absorbed in the polarizer from entering the polarizer to reflect the light on the brightness-enhanced film, and reverses the light through a reflecting layer or the like provided behind the brightness-enhanced film to make the light re-enter the brightness-enhanced plate. Since the brightness-enhanced film transmits the polarized light that is reflected and reversed between the brightness-enhanced film and the reflecting layer only if the polarized light has a polarization direction to pass the polarizer, light from a backlight or the like can be used efficiently for displaying images of a liquid crystal display in order to provide a bright screen.

An example of the brightness-enhanced film includes, for example, a film which transmits a linearly polarized light having a predetermined polarization axis and reflects other light, for example, a multilayer thin film of a dielectric or a multilayer laminate of thin films with varied refraction aeolotropy; a film that reflects either clockwise or counterclockwise circular polarized light while transmitting other light, for example, a cholesteric liquid crystal layer, more specifically, an oriented film of a cholesteric liquid crystal polymer or an oriented liquid crystal layer supported on a supportive substrate, or the like.

Therefore, with the brightness-enhanced film transmitting a linearly polarized light having a predetermined polarization axis, the transmitted light directly enters the polarizing plate with the polarization axes matched, so that absorption loss due to the polarizing plate is controlled and the light can be transmitted efficiently. On the other hand, with the brightness-enhanced film transmitting a circular polarized light, such as a cholesteric liquid crystal layer, preferably, the transmission circular polarized light is converted to linearly polarized light before entering the polarizing plate in an aspect of controlling of the absorption loss, though the circular polarized light can enter the polarizer directly. Circular polarized light can be converted to linearly polarized light by using a quarter wavelength plate as a retardation plate.

A retardation plate having a function as a quarter wavelength plate in a wide wave range of a visible light region can be obtained, for example, by overlapping a retardation layer functioning as a quarter wavelength plate for monochromatic light such as light having 550 nm wavelength and another retardation plate showing a separate optical retardation property, for example, a retardation plate functioning as a half wavelength plate. Therefore, a retardation plate arranged between a polarizing plate and a brightness-enhanced film can include a single layer or at least two layers of retardation layers.

A cholesteric liquid crystal layer also can be provided by combining layers different in the reflection wavelength and it can be configured by overlapping two or at least three layers. As a result, the obtained retardation plate can reflect circular polarized light in a wide wavelength region of a visible light region, thus providing transmission circular polarized light in a wide wavelength region.

Alternatively, a polarizing plate can be formed by laminating a polarizing plate and two or at least three optical layers like the above-mentioned polarization separating type polarizing plate. In other words, the polarizing plate can be a reflective elliptical polarizing plate, a semitransparent elliptical polarizing plate or the like, which is prepared by combining the above-mentioned reflective polarizing plate or a semitransparent polarizing plate with a retardation plate. An optical member including a lamination of two or at least three optical layers can be formed in a method of laminating layers separately in a certain order for manufacturing a liquid crystal display etc. or in a method for preliminary lamination. Because an optical member that has been laminated previously has excellent stability in quality and assembling operability, efficiency in manufacturing a liquid crystal display can be improved. Any appropriate adhesion means such as an adhesive layer can be used for lamination.

The adhesive layer can be provided on a polarizing plate or on an optical member for adhesion with other members such as a liquid crystal cell. The adhesive layer can be formed by the conventional appropriate adhesives such as an acrylic adhesive. Adhesives having a low moisture absorption coefficient and an excellent heat resistance is preferred from aspects of prevention of foaming or peeling caused by moisture absorption, prevention of decrease in the optical properties and warping of a liquid crystal cell caused by difference in thermal expansion coefficients, formation of a high quality liquid crystal display having excellent durability, etc. The adhesive layer can contain fine particles to obtain optical diffusivity. Adhesive layers can be provided on a necessary surfaces if required. For example, the polarizing plate including a polarizer and a protective layer can be provided with an adhesive layer on at least one surface of the protective layer as required.

When an adhesive layer provided on the polarizing plate or the optical member is exposed on the surface, preferably, the adhesive layer is temporarily covered with a separator for preventing contamination by the time the adhesive layer is used. The separator can be made of an appropriate thin sheet by coating a peeling agent if required, and an example of the peeling agent includes, for example, a silicone-based peeling agent, a long-chain alkyl-based peeling agent, a fluorine-based peeling agent, a peeling agent including molybdenum sulfide or the like.

The above-described members forming a polarizing plate and an optical member, such as a polarizing film, a transparent protective film, an optical layer, and an adhesive layer can have ultraviolet absorption power by treating with an ultraviolet absorber such as, for example, an ester salicylate compound, a benzophenone compound, a benzotriazole compound, a cyanoacrylate compound, a nickel complex salt compound, and the like.

The above-mentioned polarizing plate can preferably be used for formation of various apparatus such as a liquid crystal display. The liquid crystal display can be produced as conventionally known structures, such as transmission type, reflection type, or a transmission-reflection type. A liquid crystal cell forming the liquid crystal display can be selected arbitrarily from appropriate cells such as active matrix driving type represented by a thin film transistor, a simple matrix driving type represented by a twist nematic type and a super twist nematic type.

When polarizing plates or optical members are provided on both sides of a liquid crystal cell, the polarizing plates or the optical members on both sides can be the same or different. Moreover, for forming a liquid crystal display, one or at least two layers of appropriate members such as a prism array sheet, a lens array sheet, an optical diffuser, or a backlight can be arranged at appropriate positions.

EXAMPLE

Hereinafter, the present invention will be described more specifically by referring to Examples and Comparative Examples.

Example 1

A polyvinyl alcohol film having a thickness of 75 μm was stretched to three times an original length in an aqueous solution dissolving potassium iodide and iodine at the weight ratio of 7:1, and the film was further stretched in an aqueous solution containing 4 wt % of boric acid to have a total stretching ratio five times that of the original. Thereafter, the film was dried at 50° C. for four minutes, and thus a polarizer 1 was obtained. The polarization degree of the polarizer 1 at each wavelength of light for wavelengths of 550 to 700 nm was in a range of 99.7% to 100%.

A polyvinyl alcohol film having a thickness of 75 μm was stretched to three times an original length in an aqueous solution containing potassium iodide and iodine at the weight ratio of 7:1, and the film was further stretched in an aqueous solution containing 4 wt % of boric acid to have a total stretching ratio five times that of the original. Thereafter, the film was dipped in 10 wt % aqueous solution containing potassium iodide for 10 seconds and then the film was dried at 50° C. for four minutes, and thus a polarizer 2 was obtained. The polarization degree of the polarizer 2 at each wavelength of light for wavelengths of 420 to 550 nm was in a range of 99.1 to 99.9%.

Next, the polarizer 1 and the polarizer 2 were adhered by an aqueous solution containing 4 parts by weight of polyvinyl alcohol, 1 part by weight of melamine, and 95 parts by weight of water (polyvinyl alcohol-based adhesive) so that the absorption axes of the polarizers 1 and 2 were placed in parallel, followed by drying at temperature of 60° C. for three minutes, and thus a polarizer of Example 1 was obtained. A refractive index of this polyvinyl alcohol-based adhesive was 1.489.

Comparative Example 1

A polyvinyl alcohol film having a thickness of 75 μm was stretched to three times an original length in an aqueous solution dissolving potassium iodide and iodine at the weight ratio of 7:1, further stretched in an aqueous solution containing 4 wt % of boric acid to have a total stretching ratio five times that of the original, and then dipped in 4 wt % aqueous solution containing potassium iodide for five seconds and then the film was dried at 50° C. for four minutes, and thus a polarizer of Comparative Example 1 was obtained. The polarization degree of the polarizer of Comparative Example 1 at each wavelength of light for wavelengths of 420 to 700 nm was in a range of 98.3 to 99.9%.

Comparative Example 2

A polyvinyl alcohol film having a thickness of 75 μm was stretched to three times an original length in an aqueous solution dissolving potassium iodide and iodine at the weight ratio of 7:1, further stretched in an aqueous solution containing 4 wt % of boric acid to have a total stretching ratio five times that of the original, and then the film was dried at 50° C. for four minutes, and thus a polarizer of Comparative Example 2 was obtained. The polarization degree of the polarizer of Comparative Example 2 at each wavelength of light for wavelength regions of 420 to 700 nm was in a range of 63.7 to 100%.

Comparative Example 3

A polyvinyl alcohol film having a thickness of 75 μm was stretched to three times an original length in an aqueous solution dissolving potassium iodide and iodine at the weight ratio of 7:1, further stretched in an aqueous solution containing 4 wt % of boric acid to have a total stretching ratio five times that of the original, and then dipped in 10 wt % aqueous solution containing potassium iodide for ten seconds and then the film was dried at 50° C. for four minutes, and thus a polarizer of Comparative Example 3 was obtained. The polarization degree of the polarizer of Comparative Example 3 at each wavelength of light for wavelengths of 420 to 700 nm was in a range of 84.7 to 99.9%.

Figure 1:
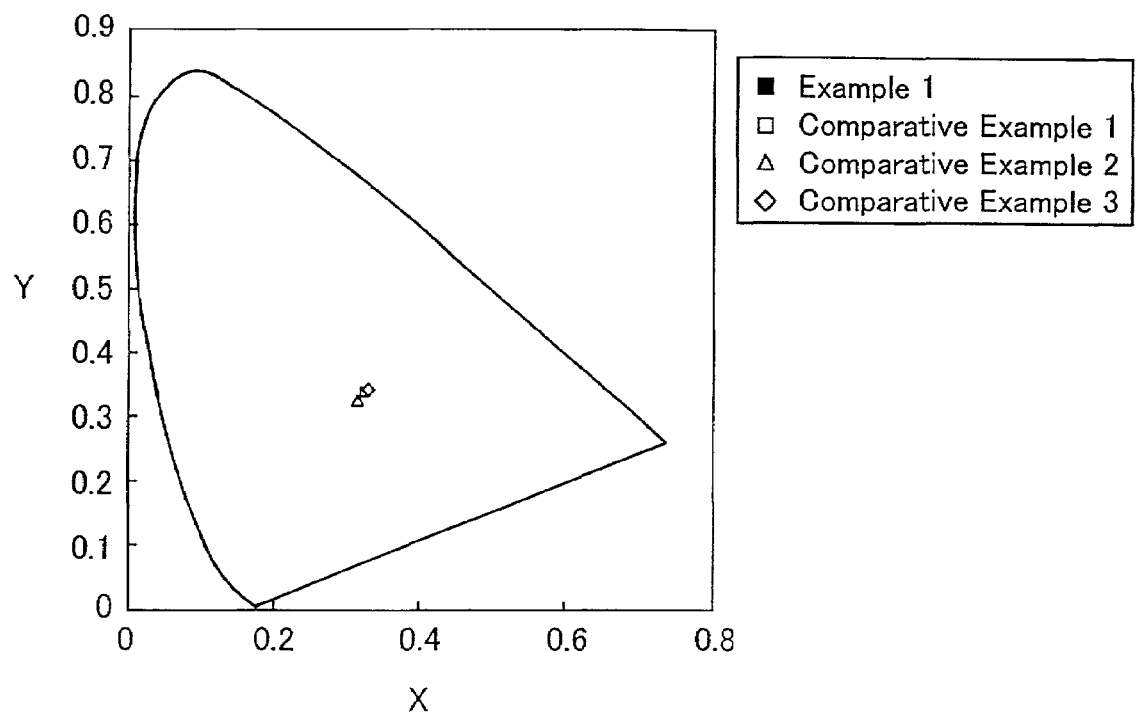
FIG. 1 shows a chromaticity diagram of a white display of a liquid crystal display panel.
Figure 2:
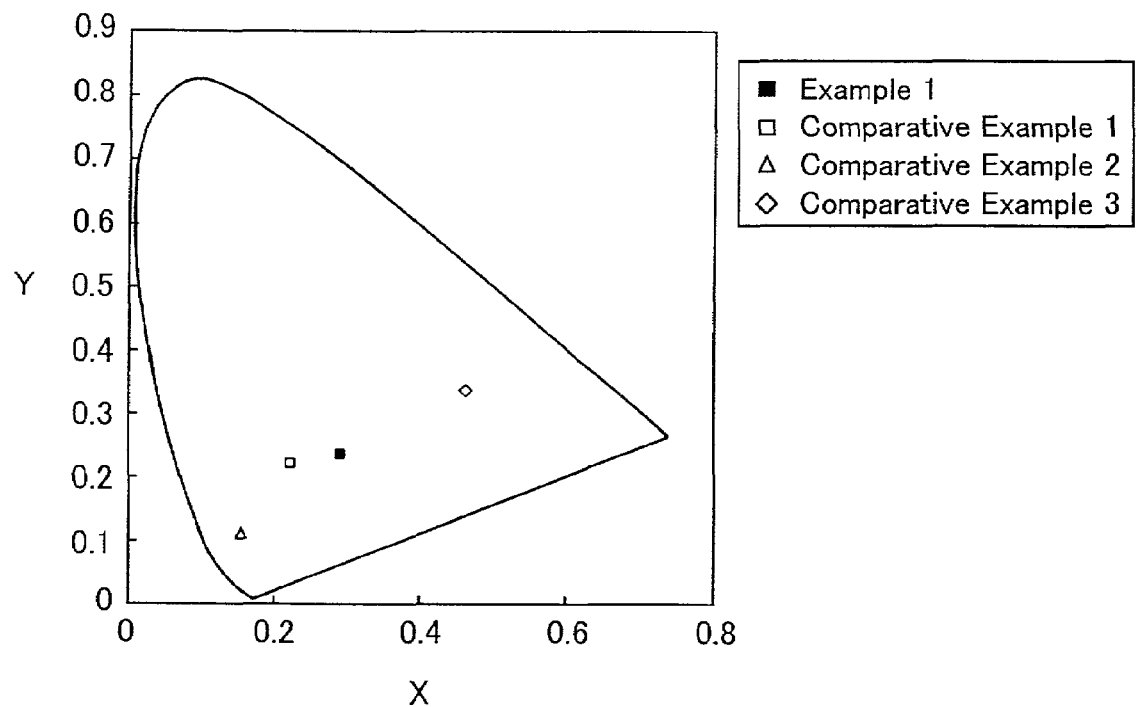
FIG. 2 shows a chromaticity diagram of a black display of a liquid crystal display panel.

The polarizers produced in Example 1 and Comparative Examples 1 to 3 were mounted on a thin film transistor (TFT) liquid crystal display. Chromaticities of white display and black display of a liquid crystal panel is measured as a chromaticity coordinate of CIE 1931 calorimetric system (second degree viewing XYZ colorimetric system) by the use of a brightness photometer BM-5A chromaticity measurement device produced by Topcon Co., Ltd. Table 1 shows the results. Furthermore, FIG. 1 is a chromaticity plot diagram of white display of liquid display panel. FIG. 2 is a chromaticity plot diagram of black display of liquid display panel.

TABLE 1

| | white display | | black display | |
|---|---|---|---|---|
| | x | y | x | y |
| Example 1 | 0.325 | 0.340 | 0.290 | 0.235 |
| Comparative Example 1 | 0.324 | 0.339 | 0.220 | 0.219 |
| Comparative Example 2 | 0.314 | 0.327 | 0.152 | 0.111 |
| Comparative Example 3 | 0.329 | 0.342 | 0.458 | 0.336 |

As is apparent from Table 1 and FIGS. 1 and 2, the hue of the white display is hardly changed and excellent in Example 1 and Comparative Examples 1 to 3. On the other hand, the chromaticity coordinate of the black display is blue in Comparative Examples 1 and 2 and red in Comparative Example 3, while the chromaticity coordinate of Example 1 is approximately neutral. It is confirmed that the hue the liquid crystal display in the present invention is improved.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A polarizing plate comprising a polarizing film, the polarizing film comprising:
   a first portion having a polarization degree of 99% or more at each wavelength of light for wavelengths of 420 to 550 nm, and
   a second portion having a polarization degree of 99% or more at each wavelength of light for wavelengths of 550 to 700 nm,
   wherein the first portion and the second portion are laminated.

2. The polarizing plate according to claim 1, wherein the first portion and the second portion are laminated by an adhesive.

3. The polarizing plate according to claim 2, wherein a refractive index of the adhesive is in a range of 1.46 to 1.52.

4. The polarizing plate according to claim 2, wherein the adhesive is a polyvinyl alcohol-based adhesive.

5. The polarizing plate according to claim 2, wherein the adhesive is a urethane-based adhesive.

6. The polarizing plate according to claim 2, wherein the first portion and the second portion are directly laminated by the adhesive.

7. The polarizing plate according to claim 1, wherein the first portion and the second portion are laminated by a pressure-sensitive adhesive.

8. The polarizing plate according to claim 7, wherein a refractive index of the pressure-sensitive adhesive is in a range of 1.46 to 1.52.

9. The polarizing plate according to claim 1, wherein the first portion having a first absorption axis and a polarization degree of 99% or more at each wavelength of light for wavelengths of 420 to 550 nm and the second portion having a second absorption axis and a polarization degree of 99% or more at each wavelength of light for wavelengths of 550 to 700 nm are laminated so that the first and second absorption axes are disposed in parallel to each other.

10. The polarizing plate according to claim 1, further comprising a reflector or a transreflector attached to the polarizing plate.

11. The polarizing plate according to claim 1, further comprising a retardation plate or a λ plate attached to the polarizing plate.

12. The polarizing plate according to claim 1, further comprising a viewing angle compensating film attached to the polarizing plate.

13. The polarizing plate according to claim 1, further comprising a brightness enhancement film attached to the polarizing plate.

14. A liquid crystal display comprising a polarizing plate according to claim 1 on at least one side of a liquid crystal cell.

15. The liquid crystal display according to claim 14, wherein the first portion and the second portion are laminated by an adhesive.

16. The liquid crystal display according to claim 15, wherein the polarizing plate is located on one side of the liquid crystal cell.

17. The liquid crystal display according to claim 16, wherein the polarizing plate transmits a linearly polarized light having a predetermined polarization axis.

18. The liquid crystal display according to claim 14, wherein the first portion and the second portion are laminated by a pressure-sensitive adhesive.

19. The liquid crystal display according to claim 18, wherein the polarizing plate is located on one side of the liquid crystal cell.

20. The liquid crystal display according to claim 19, wherein the polarizing plate transmits a linearly polarized light having a predetermined polarization axis.

21. The liquid crystal display according to claim 14, wherein the polarizing plate is located on one side of the liquid crystal cell.

22. The liquid crystal display according to claim 21, wherein the polarizing plate transmits a linearly polarized light having a predetermined polarization axis.

23. The polarizing plate according to claim 1, wherein an adhesive layer is provided on the polarizing plate and exposed at a surface thereof, and a separator for preventing contamination is provided on the adhesive layer.

24. The polarizing plate according to claim 1, wherein the first portion and the second portion are directly laminated.

25. The polarizing plate according to claim 1, wherein the first portion has a polarization degree of 99.3% or more at each wavelength of light for wavelengths of 420 to 550 nm, and the second portion has a polarization degree of 99.3% or more at each wavelength of light for a wavelengths of 550 to 700 nm.

26. The polarizing plate according to claim 1, wherein the first portion has a polarization degree of 99.5% or more at each wavelength of light for wavelengths of 420 to 550 nm, and the second portion has a polarization degree of 99.5% or more at each wavelength of light for wavelengths of 550 to 700 nm.

27. The polarizing plate according to claim 1, wherein the polarizing plate transmits a linearly polarized light having a predetermined polarization axis.

28. An optical member comprising an optical layer which is the polarizing plate according to claim 1 and at least one other optical layer.

29. An optical member comprising an optical layer which is the polarizing plate according to claim 1 and at least two other optical layers.

30. An optical member comprising a polarizing plate according to claim 1 and an adhesive layer exposed on a surface of the optical member for adhesion with other members.

31. An optical member according to claim 30, wherein the adhesive layer is temporarily covered with a separator.

32. A polarizing plate according to claim 1, wherein a transparent protective film is provided on a side of the polarizing film.

33. A polarizing plate according to claim 32, wherein no protective film is provided between the first and second portions of the polarizing film.

34. A polarizing plate according to claim 1, wherein the first portion and the second portion are directly laminated by an adhesive, and a transparent protective layer is provided on one side or both sides of the polarizing film.

* * * * *